United States Patent
Centner (10) Patent No.: US 9,703,881 B2
(45) Date of Patent: *Jul. 11, 2017

(54) SYSTEM, APPARATUS AND METHOD FOR GENERATION OF CONTENT FOR DISTRIBUTED HETEROGENOUS COMPUTERS

(71) Applicant: STREETMEET INC., Toronto (CA)

(72) Inventor: Olivier Centner, Toronto (CA)

(73) Assignee: STREETMEET INC., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/801,229

(22) Filed: Jul. 16, 2015

(65) Prior Publication Data
US 2015/0324474 A1 Nov. 12, 2015

Related U.S. Application Data

(63) Continuation of application No. 13/576,380, filed as application No. PCT/CA2010/000238 on Feb. 22, 2010, now Pat. No. 9,178,913.

(51) Int. Cl.
*H04L 29/06* (2006.01)
*H04L 29/08* (2006.01)
*G06F 17/30* (2006.01)

(52) U.S. Cl.
CPC .. *G06F 17/30873* (2013.01); *G06F 17/30905* (2013.01); *H04L 65/103* (2013.01); *H04L 67/10* (2013.01)

(58) Field of Classification Search
CPC .. G06F 17/30873; H04L 65/103; H04L 67/10

USPC ........ 709/203, 217, 219, 231, 246; 715/764, 715/767, 802
See application file for complete search history.

(56) References Cited

U.S. PATENT DOCUMENTS

| | | | |
|---|---|---|---|
| 8,321,401 B2* | 11/2012 | Edwards | G06F 17/30817 707/709 |
| 2010/0114857 A1* | 5/2010 | Edwards | G06F 17/30817 707/709 |
| 2010/0235781 A1* | 9/2010 | Friedlander | G06F 3/0481 715/803 |

OTHER PUBLICATIONS

"Adaptive Web Navigation for Wireless Devices"—Anderson et al, University of Washington, Apr. 2001 http://homes.cs.washington.edu/~pedrod/papers/ijcai01.pdf.*
Parent U.S. Pat. No. 9,178,913 issued Nov. 3, 2015—Centner, Olivier—System, Apparatus and Method for Generation of Content for Distributed Hetrogenous Computers.

* cited by examiner

*Primary Examiner* — Randy Scott
(74) *Attorney, Agent, or Firm* — Perry + Currier Inc.

(57) ABSTRACT

A system, apparatus and method for generation of content for distributed heterogeneous computers is provided. A server can connect to a network, which in turn is connected to a plurality of client computing devices, a plurality of fixed display computers and a plurality of administration computers. The server is configured to receive content form the administration computers, and to adjust the received content for one or more of the respective fixed display computing and to also adjust the received content for one or more of the client computing devices.

5 Claims, 11 Drawing Sheets

SYSTEM, APPARATUS AND METHOD FOR GENERATION OF CONTENT FOR DISTRIBUTED HETEROGENOUS COMPUTERS

CROSS-REFERENCE TO RELATED APPLICATION

This application is a continuation of U.S. patent application Ser. No. 13/576,380, filed Jul. 31, 2012, which in turn is a National Entry of International PCT Application No. PCT/CA2010/000238 filed Feb. 22, 2010, the contents of which are incorporated herein by reference.

FIELD

The present specification relates generally to networked computing and more specifically relates to a system, apparatus and method for generation of content for distributed heterogeneous computers.

BACKGROUND

Web pages and other Internet content are commonly used as a means to efficiently and effectively disseminate information, replacing more traditional media. However, such content can quickly become stale. Furthermore, there is increasing pressure to maintain an Internet presence across a wide variety of computing environments. For example, digital signage, web pages, social media applications such as Facebook and Twitter, and web directories are all places where content can be generated. However, the interfaces and portals through which content is updated in each of these environments is quite different. This further exacerbates the problem of content becoming stale, for an update to one Internet presence can necessitate an update to all computing environments where an Internet presence can be delivered. A still further problem is that even in undertaking the changes to each of the computing environments, there can be a significant time lag. For example, it may take one day to update a Facebook site, and then another day to update a web site, leading to a period of time where content may be contradictory.

SUMMARY

An aspect of this specification provides a method and system for content generation by providing a server that interconnects one or more content administration sessions and a plurality of heterogeneous computing environments. The server is configured to receive content via the content administration session. The server is also configured to maintain one or more databases containing mapping information representing target data structures for each of the computing environments. The server is configured to automatically generate content for each of the computing environments based on the mapping information.

An aspect of this specification provides a method for generation of content for distributed heterogeneous computers comprising: receiving a content administration request; establishing a content administration session in response to said request; receiving content via said content administration session; receiving a first computing environment profile for a fixed display computer; receiving a second computing environment profile for a client computing device; said second computing environment profile being different from said first computing environment profile; generating a first set of modified content for said fixed display computer and uploading said first set of modified content to said fixed display computer; and, generating a second set of modified content for said client computing device and publishing said second set of modified content for access via client computing device.

The method can further comprise receiving an additional computing environment profile for an additional client computing device; said additional computing environment profile being different from said first computing environment profile and said second computing environment profile; and generating a third set of modified content for said client computing device and publishing said third set of modified content for access via said additional client computing device.

The second computing environment profile can comprise at least one of a standard web-browser application and a social networking application.

The first computing environment profile can exclude incorporation of any input devices and said second computing environment profile can at the same time include at least one input device. In this context, the generating of said first set of modified content excludes content navigation via input device and said generating said second set of modified content includes content navigation via input device.

Where content navigation via an input device is excluded, then content navigation can be effected by automatic timers, whereby content changes according to a passage of a period of time. The content change can be based on automatically scrolling through different pages of said content.

Where content navigation via an input device is included, the second set of modified content can be configured to scroll through different pages of said content based on input device instructions.

The first computing environment profile and said second computing environment profile can differ according to at least one of screen size, number of pixels of a display, number of displayable colours, refresh rates.

The first set of modified content can be blended with additional content according to the geographic location of said fixed display computer. The additional content can comprise one or more of local news, local weather, and advertising.

The second set of modified content comprises one or more web pages configured for windowing within another web site.

Another aspect of this specification provides an administrative server configured for generation of content for distributed heterogeneous computers comprising: a network interface connected to a network; at least one processor connected to said network interface and configured for receiving a content administration request from an administration computer via said network interface; said at least one processor configured to establish a content administration session in response to said request with said administration computer; said at least one processor configured to receive content from said administration computer via said content administration session; said at least one processor configured to receive a first computing environment profile for a fixed display computer; said at least one processor configured to receive a second computing environment profile for a client computing device; said second computing environment profile being different from said first computing environment profile; said at least one processor configured to generate a first set of modified content for said fixed display computer and to upload said first set of modified content to said fixed display computer; and, said at least one processor configured to generate a second set of modified content for said client computing device and publishing said second set of modified content for access via client computing device.

In accordance with the teachings of this specification, a single administrative computer can be used to administer content generation across wide variety of computing environments, including without limitation, web page available on a traditional desktop browser, web pages available on a mini-browser on a portable electronic device, social network sites such as Facebook and Twitter, a digital outdoor sign, a listing in a web page directory, and search engines.

DETAILED DESCRIPTION OF THE EMBODIMENTS

A system, apparatus and method for generation of content for distributed heterogeneous computers is provided. A server can connect to a network, which in turn is connected to a plurality of client computing devices, a plurality of fixed display computers and a plurality of administration computers. The server is configured to receive content form the administration computers, and to adjust the received content for one or more of the respective fixed display computing and to also adjust the received content for one or more of the client computing devices.

Figure 1:
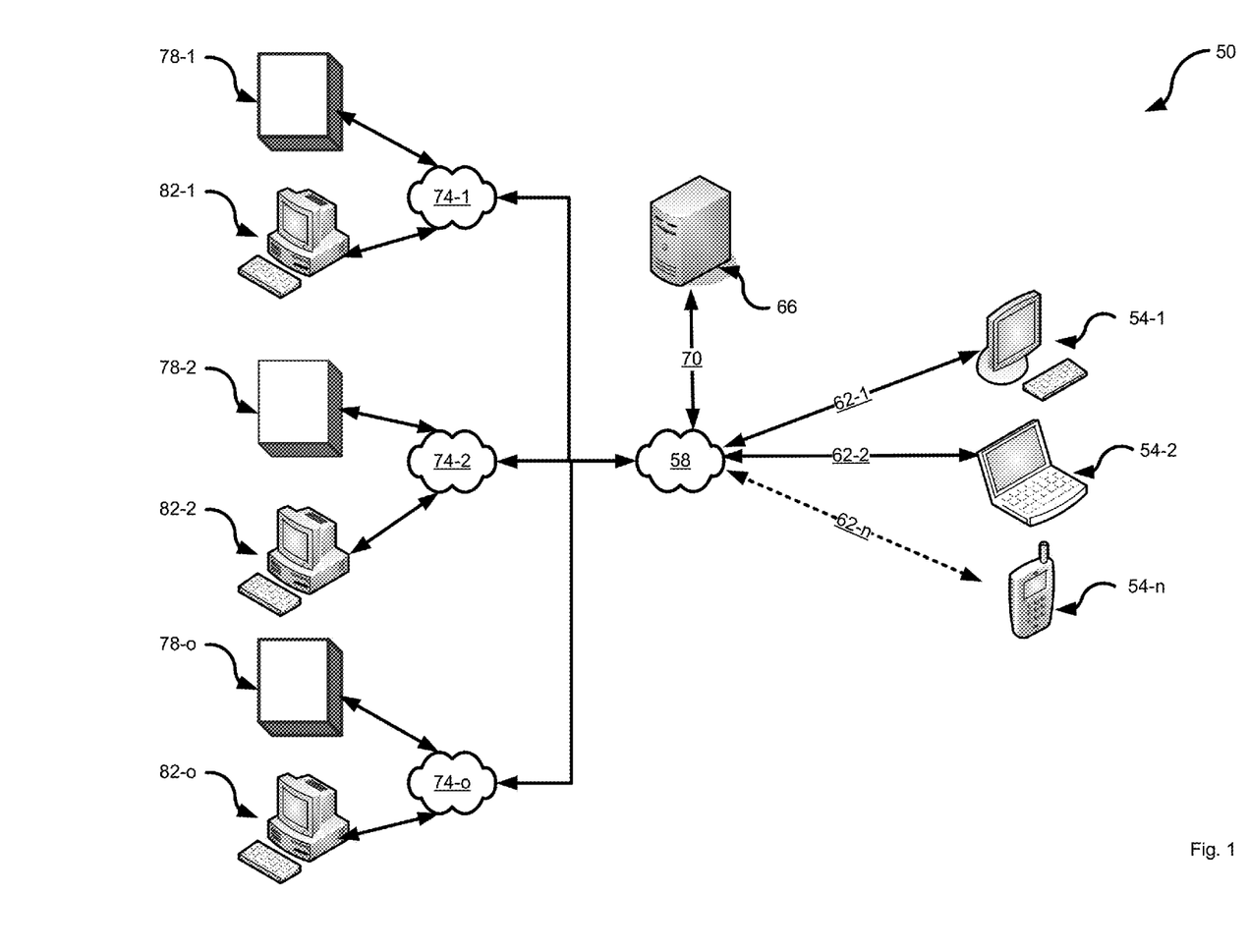
FIG. 1 shows a schematic representation of a system for generation of content for distributed heterogeneous computers.

Referring now to FIG. 1, a non-limiting example of a system for generation of content for distributed heterogeneous client machines is indicated generally at 50. System 50 comprises a plurality of heterogeneous client computing devices 54-1, 54-2 . . . 54-n (collectively, computing devices 54, and generically, computing device 54. This nomenclature is used elsewhere).

Each computing device 54 can be any type of computing device that can be used in a self-contained manner and to interact with content available over network 58. Interaction includes displaying of information on computing device 54 as well as to receive input at computing device 54 that can in turn be sent back over network 58. Each device 54 thus includes a plurality of input mechanisms such as a keyboard, a pointing device, and a microphone 104. A pointing device can be implemented as a track wheel, trackball or the like. Other input devices, such as a touch screen are also contemplated. Input from input mechanisms are received at a processor that is configured to communicate with a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 54 as described herein are typically maintained, persistently, in the non-volatile storage unit and used by the processor which makes appropriate utilization of volatile storage during the execution of such programming instructions. It should be understood that the non-volatile storage unit and volatile storage unit are non-limiting examples of computer readable media which can store programming instructions that are executable on the device's processor. Such computer readable media can also comprise removable non-volatile storage.

The processor of device 54 is in turn is also configured to control various output mechanisms, such as a speaker and a display. In a present embodiment, device 54 is also configured to maintain various applications such as, by way of non-limiting example, web browsers and streaming media players.

In the example embodiment, client computing device 54-1 is a desktop computer, client computing device 54-2 is a laptop computer, and client computing device 54-n is a mobile electronic device such as a BlackBerry™ or an Iphone™. In this example, client 54-n is equipped with a mini-browser capable of generating web pages that are optimized for desktop computers.

Client computing devices 54 are connected to a communication network 58 via links 62. In a present embodiment, communication network 58 is the Internet. The types of links 62 are not particularly limited, but in a present embodiment, link 62-1 and link 62-2 are shown as solid lines to represent wired links, while link 62-n is shown as a dotted line to represent a wireless link. Each device 54 therefore also contains at least one network interface, which are implemented in a present embodiment as radios configured to communicate over links 62. In general, it will be understood that the device's interface(s) is (are) configured to correspond with the network architecture that defines a particular link 62.

At least one server computer 66 also connects to network 58 by a backhaul link 70. As will be discussed further below, server computer 66 is configured to generate and otherwise maintain content for a plurality of heterogeneous computing devices.

In addition, a plurality of local networks 74-1, 74-2 . . . 74-o also connects to communication network 58. Local networks 74 can be private networks such as local area networks that are configured and operated by an enterprise or other organization. In turn, each local network 74 in turn connects to a fixed display computer 78 and an administration computer 82. As will be understood from reading further, administration computers 82 need not be connected to local network 74 and that the content discussed herein can be administered from any computer that connects to network 58. Each administration computer 82 can comprise a hardware and software environment that is generally consistent with the type of hardware and software environment described in relation to the computing devices 54. As will be discussed in greater detail below, however, each administration computer 82 is generally configured to interact with server 66 so as to create and maintain content.

Figure 2:
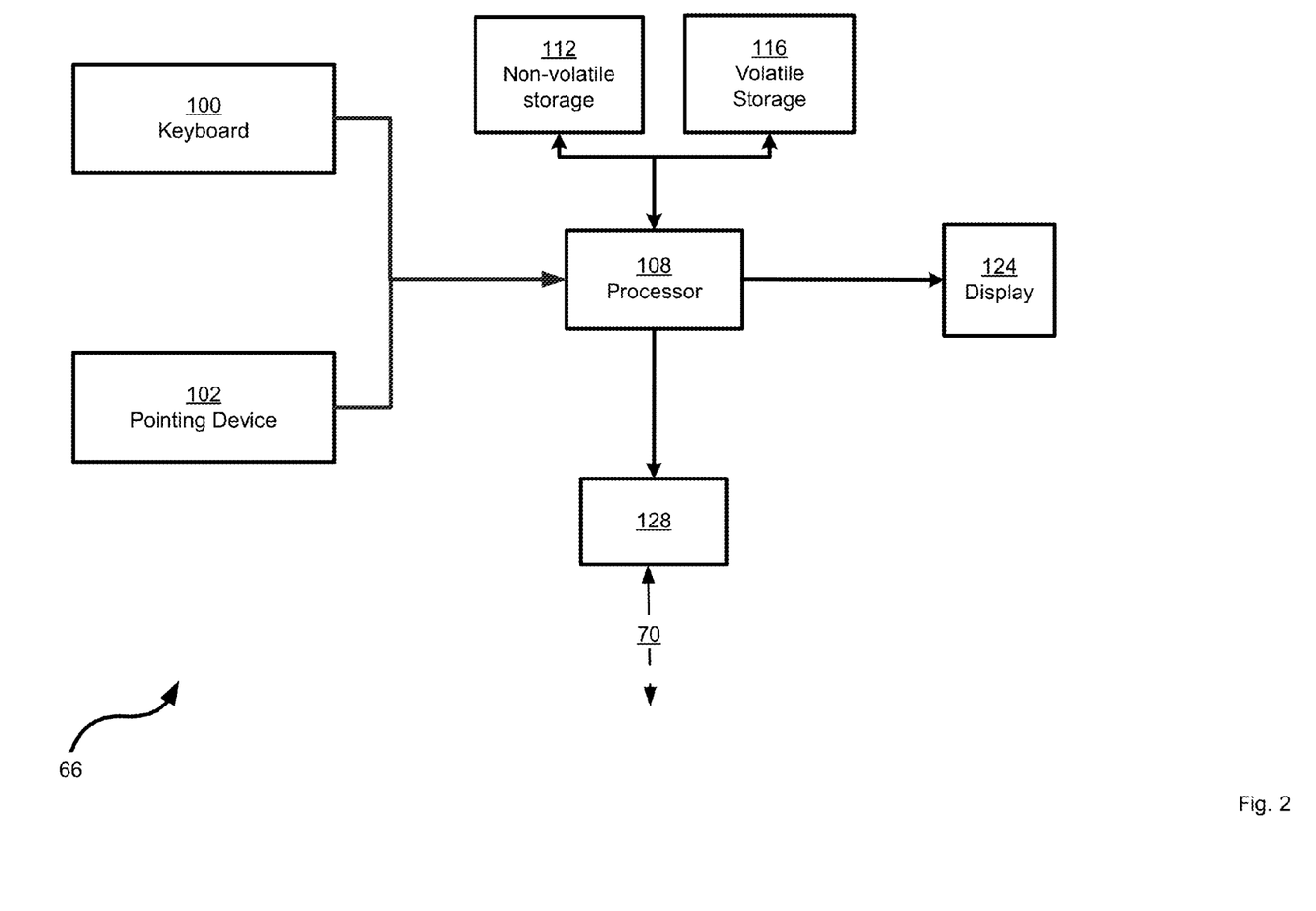
FIG. 2 shows a schematic representation of the server computer of the system of FIG. 1.

Referring to FIG. 2, server computer 66 can be based on any well-known server environment including various input devices such as a keyboard 100 and a pointing device 102 can be used to provide input to one or more central processing units 108. Server computer 66 can include a module that houses the one or more central processing units 108, as well as volatile storage 116 (e.g. random access memory), non-volatile storage 112 (e.g. hard disk devices) and network interfaces 128 to allow server computer 66 to communicate over network 58. Various output devices such as a display 124 that are controlled by the one or more central processing units 108 can also be provided. For example, server computer 66 can be a Sun Fire V480 from Sun Microsystems, Inc. of Palo Alto Calif., running a UNIX operating system, and having four central processing units each operating at about nine-hundred megahertz and having about sixteen gigabytes of random access memory. However, it is to be emphasized that this particular server is merely exemplary, and a vast array of other types of computing environments are contemplated.

In general, the term computing environment is used herein to refer to the collection of hardware, operating systems and applications that can be used to generate content. For example, a Ipod Touch from Apple Computer represents a particular combination of hardware and operating system, while Safari represents a mini-webrowser application. A computing environment profile, as discussed below, comprises data identifying such a combination of hardware, operating system and applications, as well as a mapping between a single, standardized data schema representing received content for generation, to a plurality of different data schemas that are unique to each heterogeneous computing environment.

Figure 3:
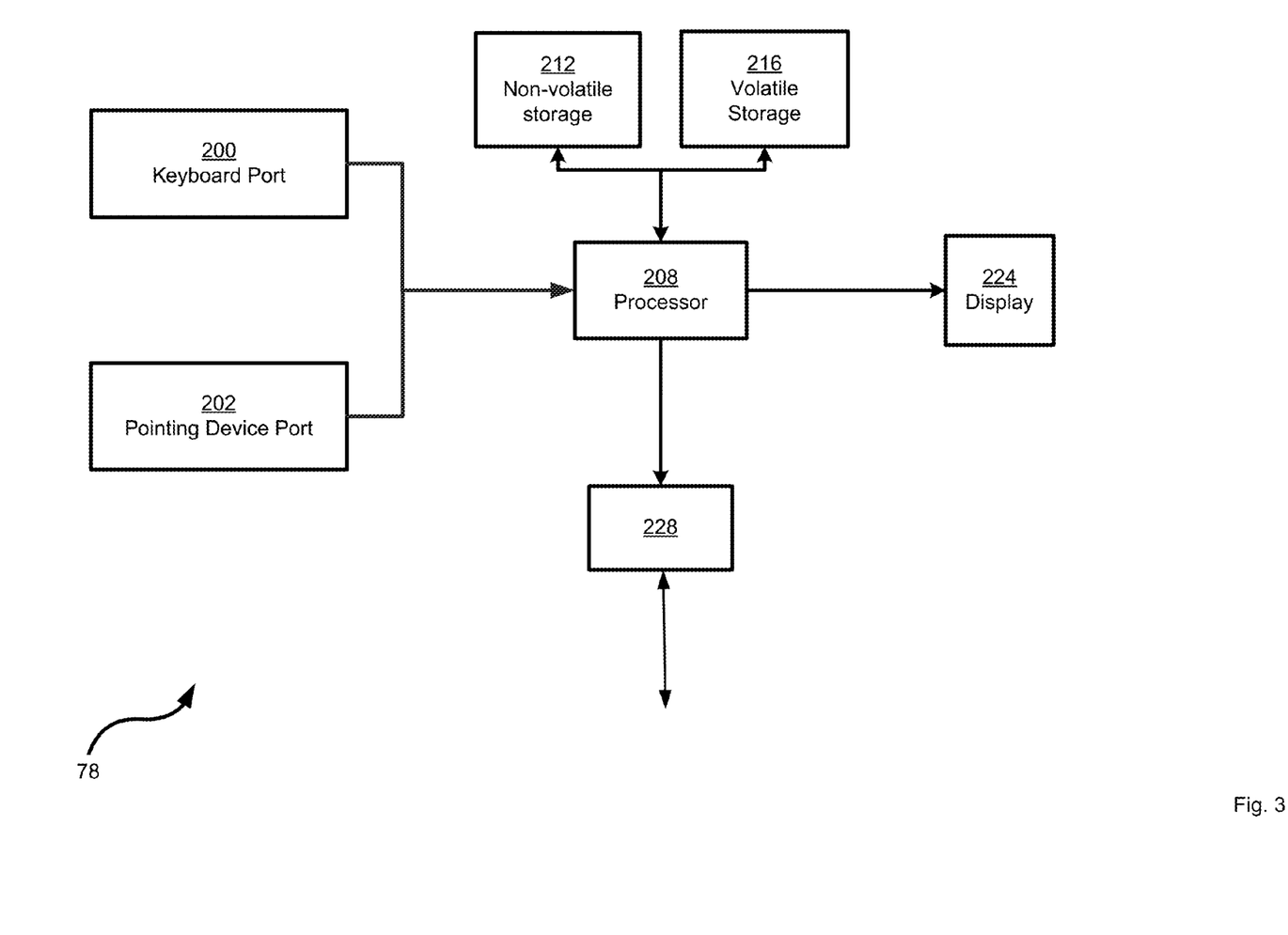
FIG. 3 shows a schematic representation of the fixed display computers of the system of FIG. 1.

Referring to FIG. 3, fixed display computer 78 can be based on any well-known computing environment including ports for various input devices such as a keyboard port 200 and a pointing device port 202, such that when a keyboard or pointing device is connected, it can be used to provide input to one or more central processing units 208. Fixed display computer 78 can include a module that houses the one or more central processing units 208, as well as volatile storage 216 (e.g. random access memory), non-volatile storage 212 (e.g. hard disk devices) and a network interface 228 to allow fixed display computer 78 to communicate over network 74 and network 58 with server computer 66 or an administration computer 82. An output device such as a display 224 that is controlled by the one or more central processing units 208 can also be provided. For example, fixed display computer 78 can be based on a MacMini from Apple Inc., or an ASUS EEE from ASUSTek Computers, but it is to be emphasized that other types of computing environments are contemplated.

Figure 4:
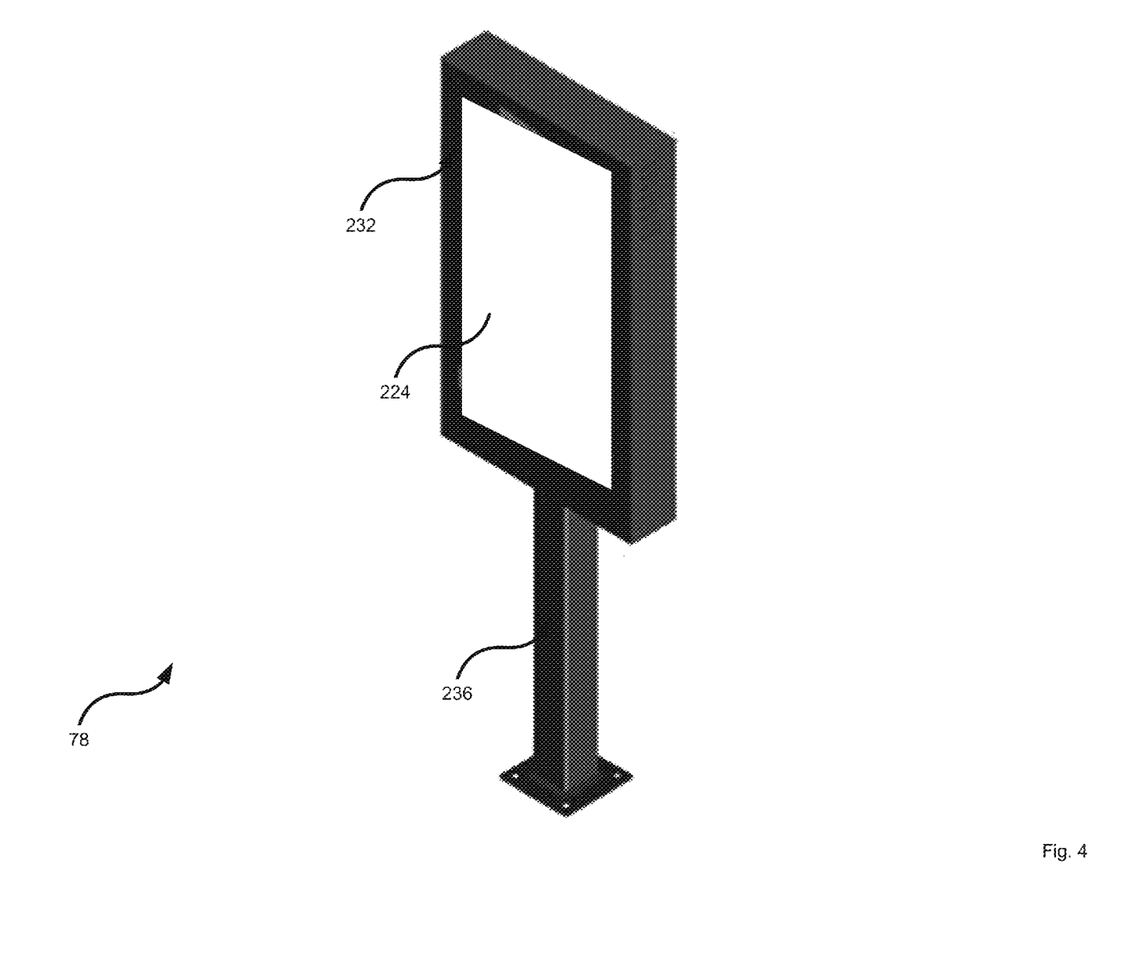
FIG. 4 shows an example of a chassis for the fixed display computer of FIG. 3.

Referring now to FIG. 4, in a present embodiment, each fixed display computer 78 is mounted within a ruggedized, weather-resistant, vandal-resistant chassis 232 that is mounted on a rigid stand 236. In this example, each fixed display computer 78 is configured for installation on or near the premises of an enterprise. A common type of enterprise where fixed display computer 78 can be deployed is a restaurant and the content being deployed thereon comprises a menu and related advertising, promotion and marketing materials for that restaurant. Other types of enterprises are contemplated, including car dealerships in which case the content being deployed thereon comprises advertising, promotion and marketing materials for automobiles. Other types of enterprises where fixed display computer 78 can be deployed will now occur to those skilled in the art.

Figure 5:
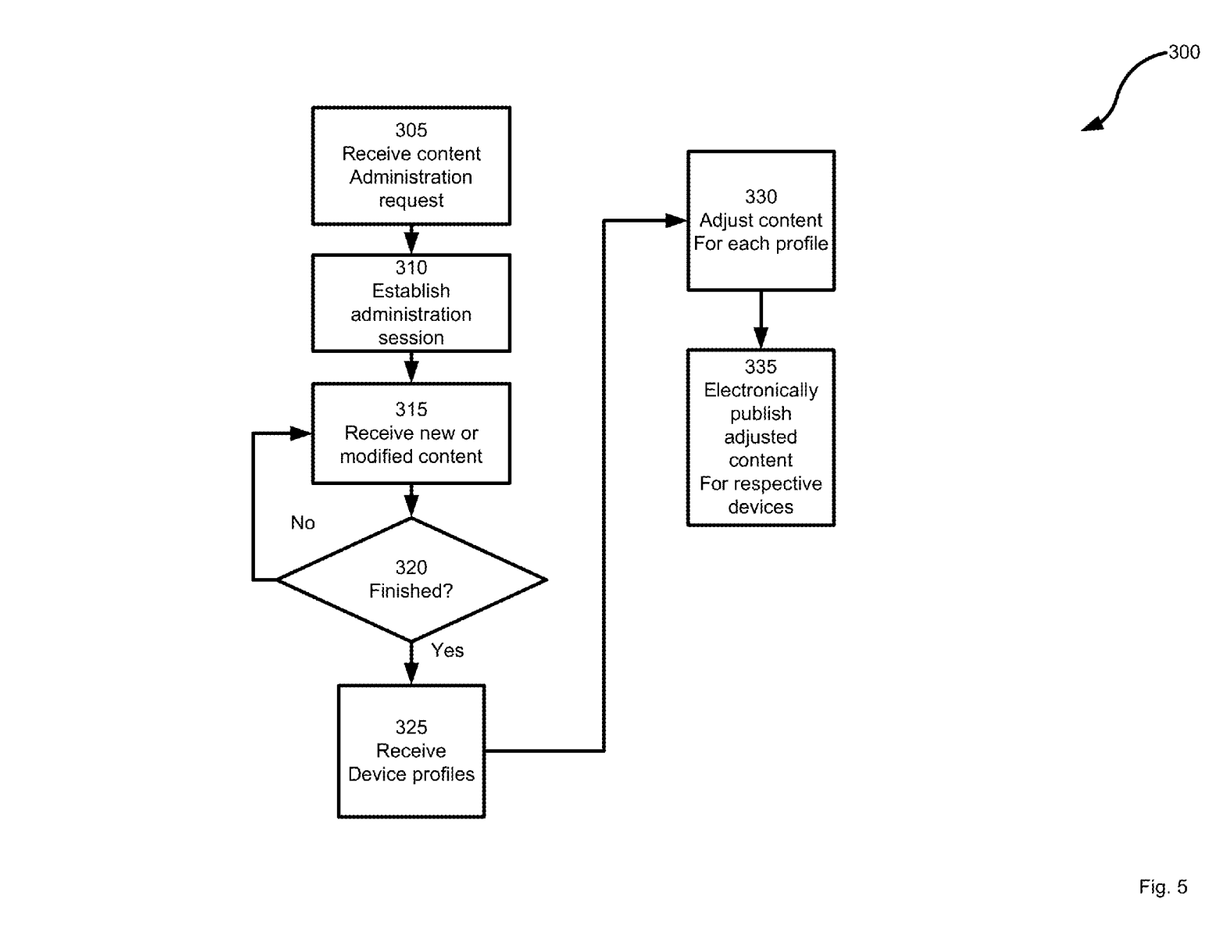
FIG. 5 shows a flow-chart depicting a method for generation of content on distributed heterogeneous computers.

Referring now to FIG. 5, a flowchart depicting a method for content generation on distributed heterogeneous computing devices is indicated generally at 300. Method 300 can be implemented on system 50 or a suitable variation thereof.

Figure 6:
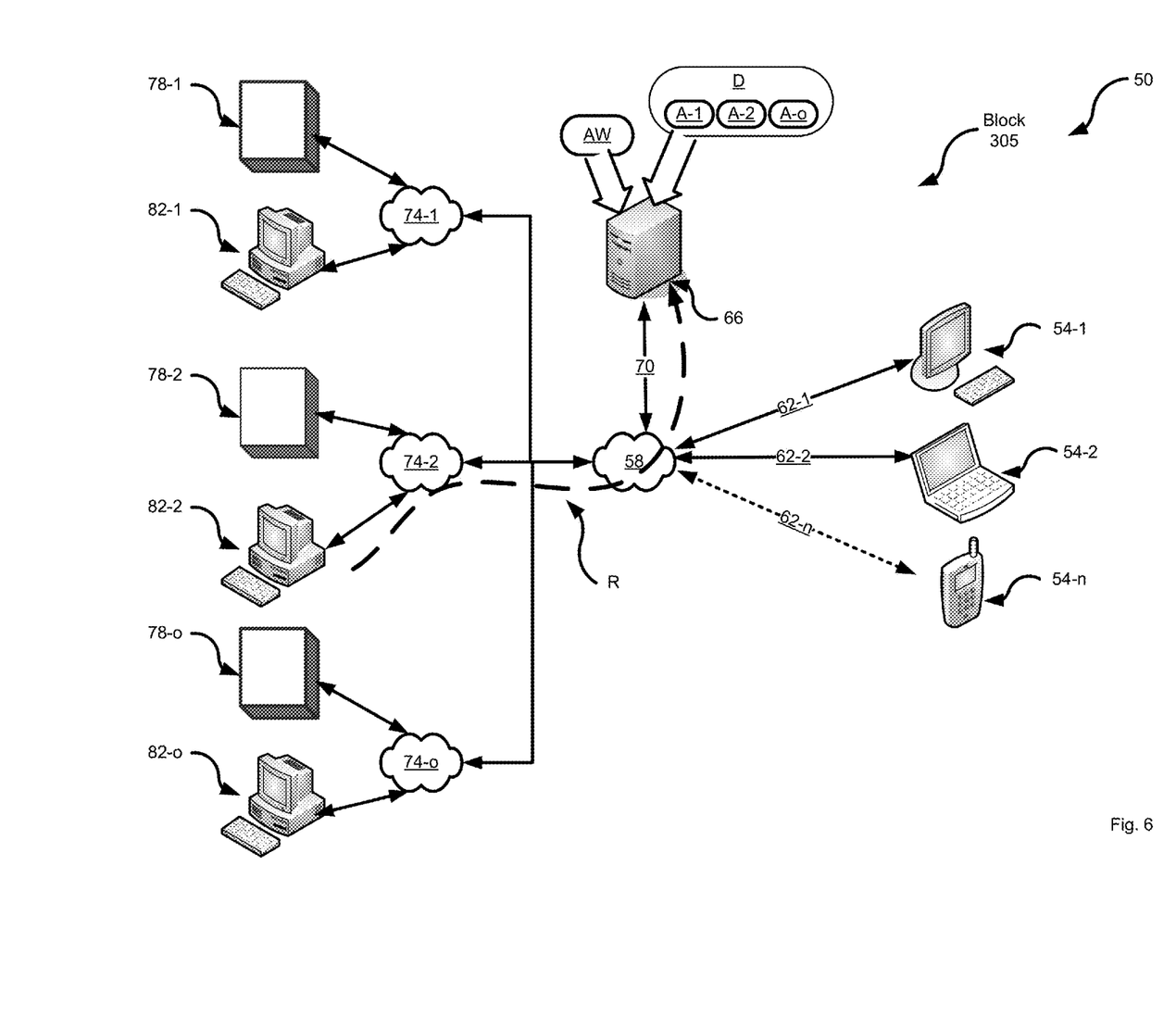
FIG. 6 shows the system of FIG. 1 during performance of one of the blocks from FIG. 5.

Block 305 comprises receiving a content administration request. Exemplary performance of block 305 is shown in FIG. 6, wherein administration computer 82-2 is shown, via a dotted line, as sending a request R to server computer 66. Request R can be effected by administration computer 82-2 accessing a secure administration web site AW hosted by server 66. Administration web site AW can require entry of user credentials that associate with a particular account A maintained within a database D that is stored within (or otherwise associated with) server computer 66. Each account A is respective to a particular fixed display computer 78, and accordingly, request R represents a request to provide new or modified content for generation on that fixed display computer 78.

Figure 7:
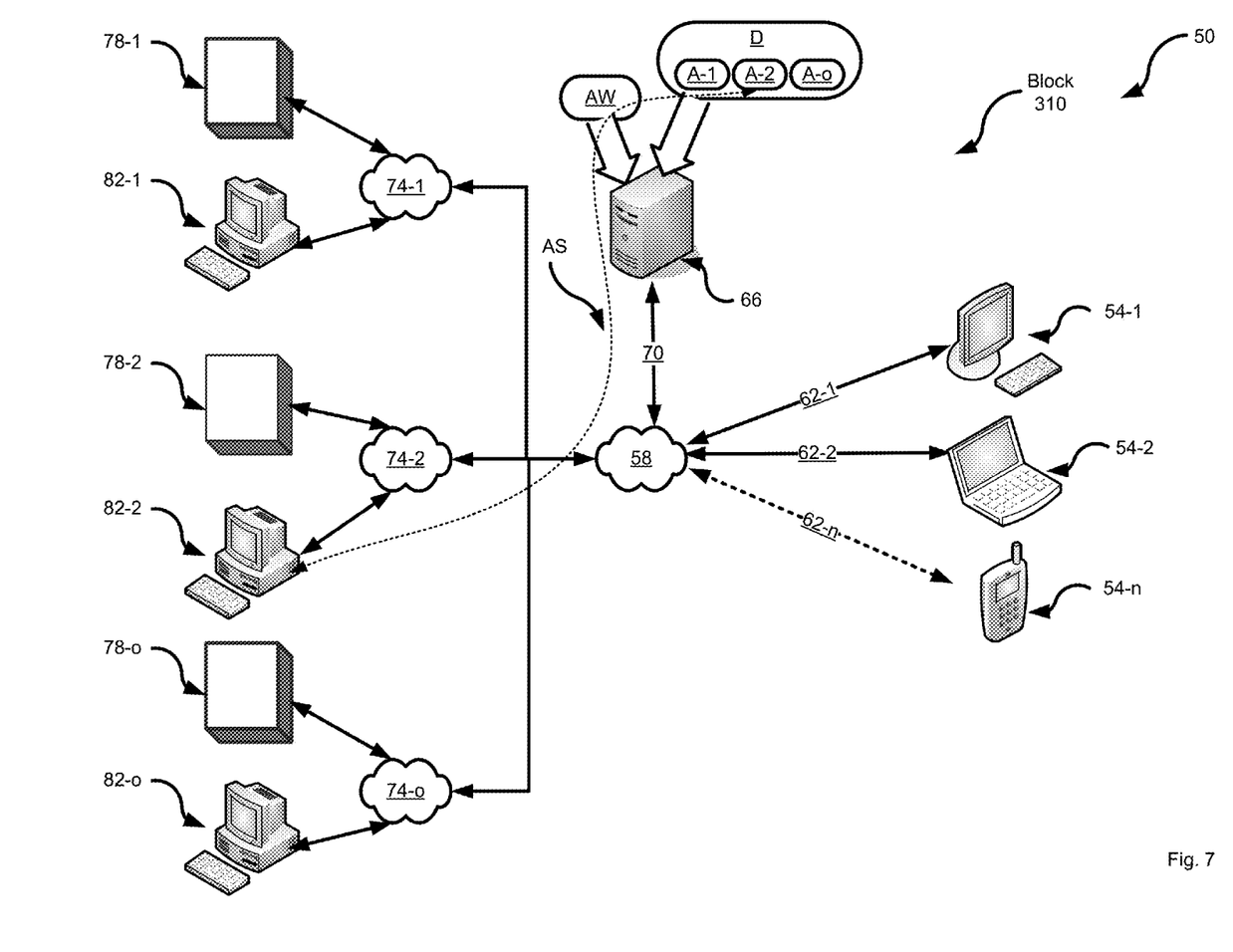
FIG. 7 shows the system of FIG. 1 during performance of one of the blocks from FIG. 5.

Block 310 comprises establishing an administration session. Exemplary performance of block 310 is shown in FIG. 7, wherein administration computer 82-2 is shown, via a dotted line, as having a secure administration session AS with server computer 66 in relation to account A-2. Administration session AS, in present exemplary embodiment, is shown as being conducted via administration web site AW, whereby administration web site AW includes programming to provide graphical interfaces on administration computer 82-2 that permit provision of new or modified content for account A-2, which in turn is associated with fixed display computer 78-2.

Figure 8:
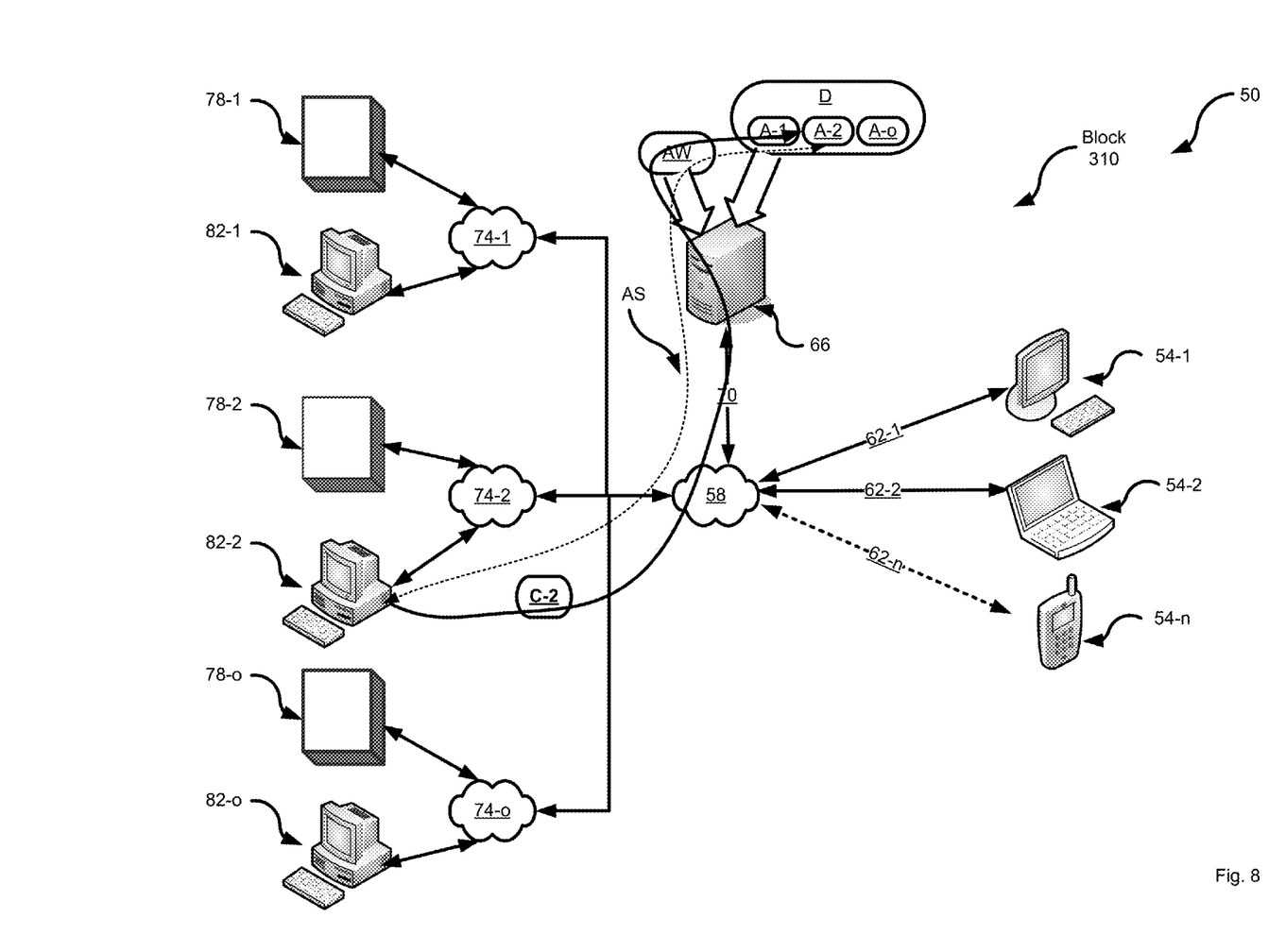
FIG. 8 shows the system of FIG. 1 during performance of one of the blocks from FIG. 5.
Figure 9:
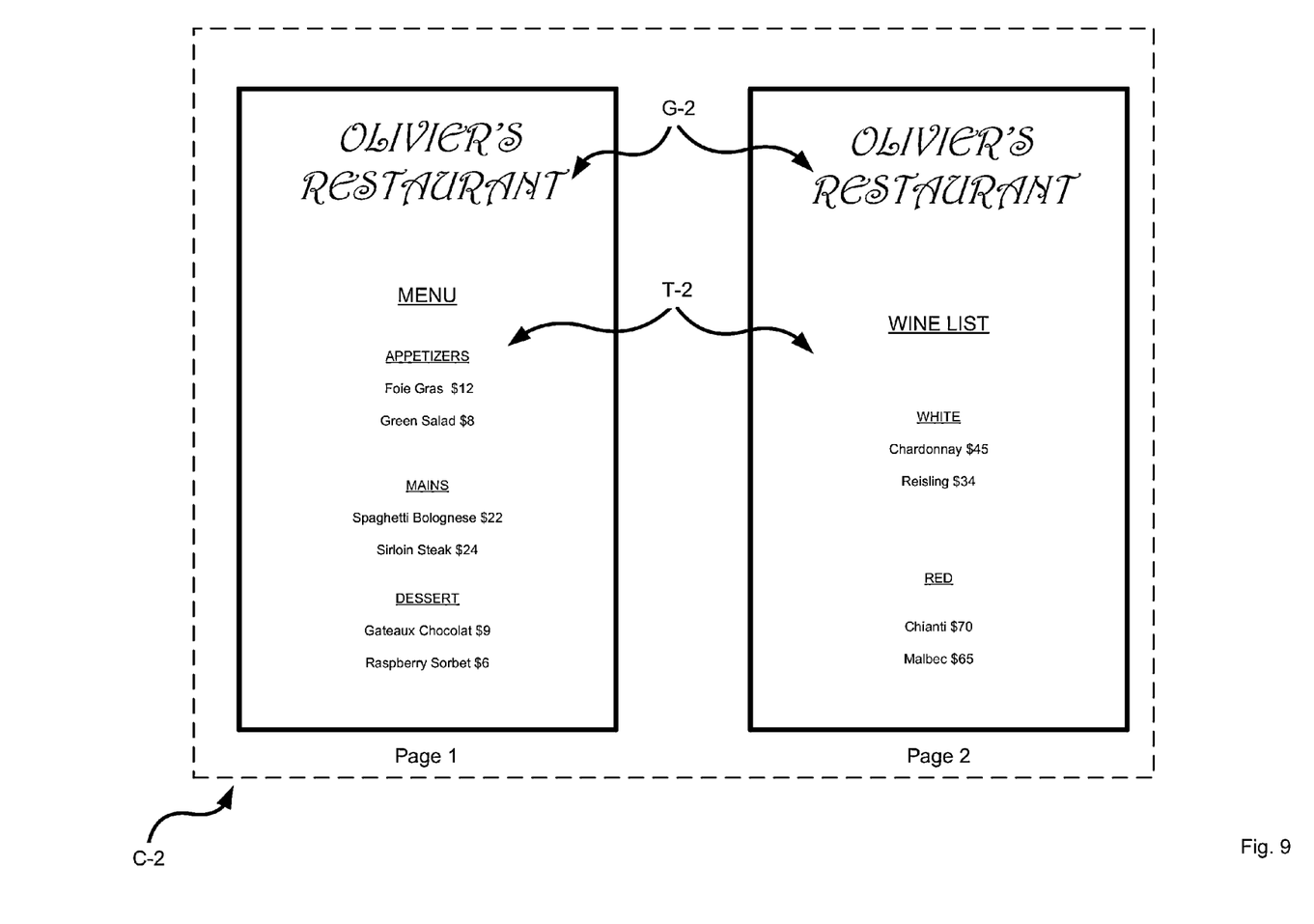
FIG. 9 provides an example of content that can be received according to the method of FIG. 5.

Block 315 comprises receiving new or modified content. Continuing with the example in relation to fixed display computer 78-2, block 315 can thus comprise either generating new content for fixed display computer 78-2, or modifying existing content that has been previously generated for fixed display computer 78-2. For purposes of explanation, it will be assumed that new content is being sent from administration computer 82-2 to server computer 66 via graphical and other interfaces generated on administration computer 82-2 by administration session AS. Exemplary performance of block 315 is shown in FIG. 8, wherein administration computer 82-2 is shown, via a dotted line, as sending content C-2 via administration sessions AS. Once received at server computer 66, content C-2 becomes associated with account A-2.

Where the enterprise that operates fixed display computer 78-2 is a restaurant, then content C-2 can be a menu for that restaurant. FIG. 9 provides an example of content C-2 that can be received according to this example. Content C-2 comprises two pages of a menu for a fictional restaurant called "Olivier's Restaurant", a fictional name for the enterprise that operates fixed display computer 78-2. Each page comprises a graphic G-2 and text T-2. Graphic G-2 can be in the form of a bitmap or the like and in the example the bit map graphic reads as "Olivier's Restaurant" in fancy-style script, although it will be understood that graphic G-2 can be a picture. Text T-2 is in the form of American Standard Code for Information Interchange (ASCII) text in given font, font size and other font characteristics such as underlining, italics, etc. Text T-2 lists various menu items that are available for ordering. It will be understood that, in addition to graphic G-2 and text T-2 as shown, content C-2 is stored and organized so as to include page dimensions, locations and other characteristics, according to a Document Object Model (DOM), even though those characteristics are not expressly shown in FIG. 9.

Referring again to FIG. 3, block 320 comprises cycling back to block 315 until the content addition or modification is complete. Block 325 comprises receiving device profiles. Continuing with the example from above, block 325 thus comprises receiving computing environment profiles for fixed display computer 78-2, as well at least one client computing device 54. In an example embodiment, it is contemplated that fixed display computer 78-2 has at least one computing environment configuration that is different from the computing environment than at least one client computing device 54. In a present embodiment, the profile for at least one client computing device 54 is based on a standard desktop computing environment configuration configured with Internet Explorer™ or Firefox™. Accordingly, block 325 comprises receiving computing environment profiles for fixed display computer 78-2 and a standard desktop computing environment. An example of at least one difference between these computing profiles is that no input device is attached, by default, to fixed display computer 78-2, while an input device is provided for each client computing device 54.

Figure 10:
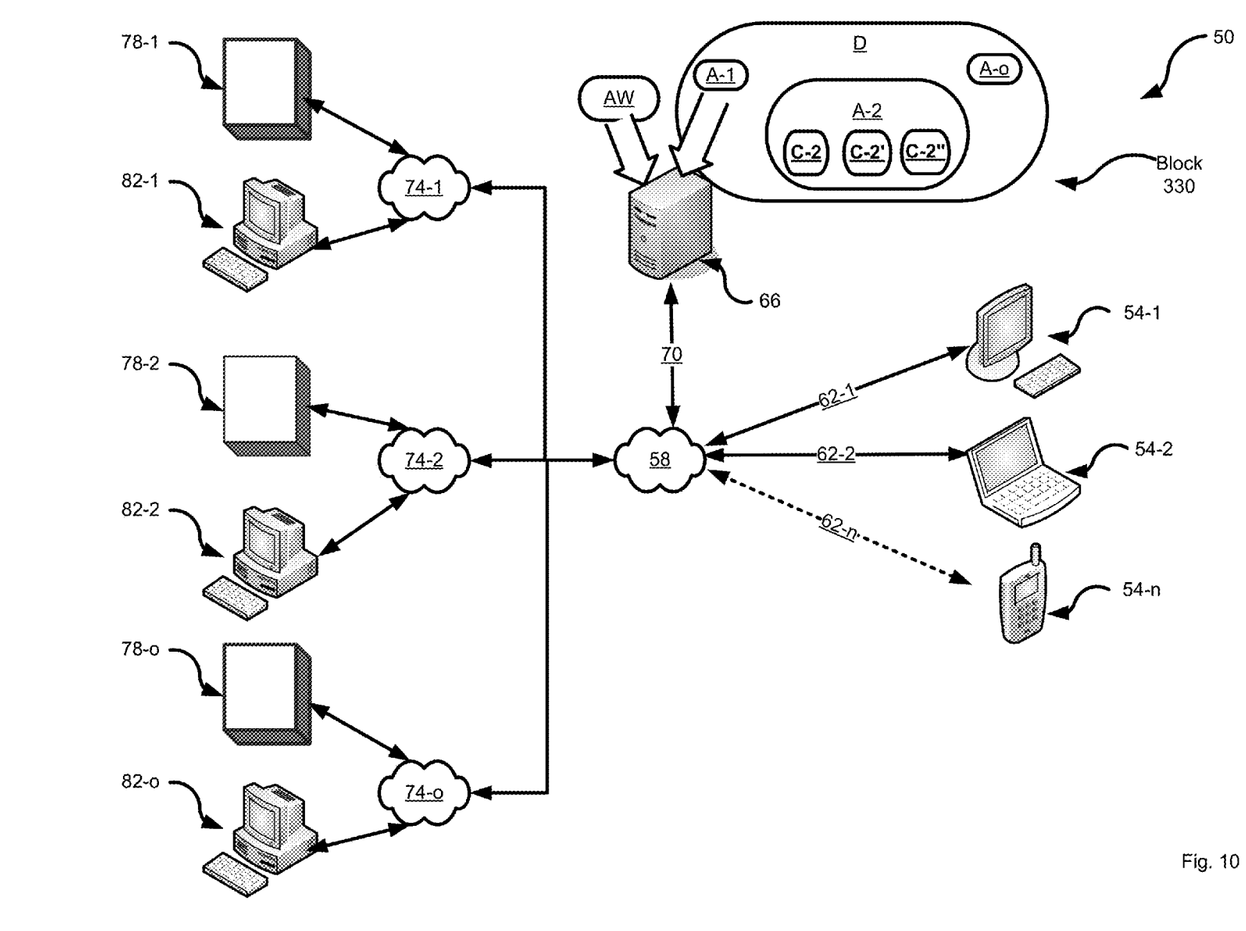
FIG. 10 shows the system of FIG. 1 during performance of one of the blocks from FIG. 5.
Figure 11:
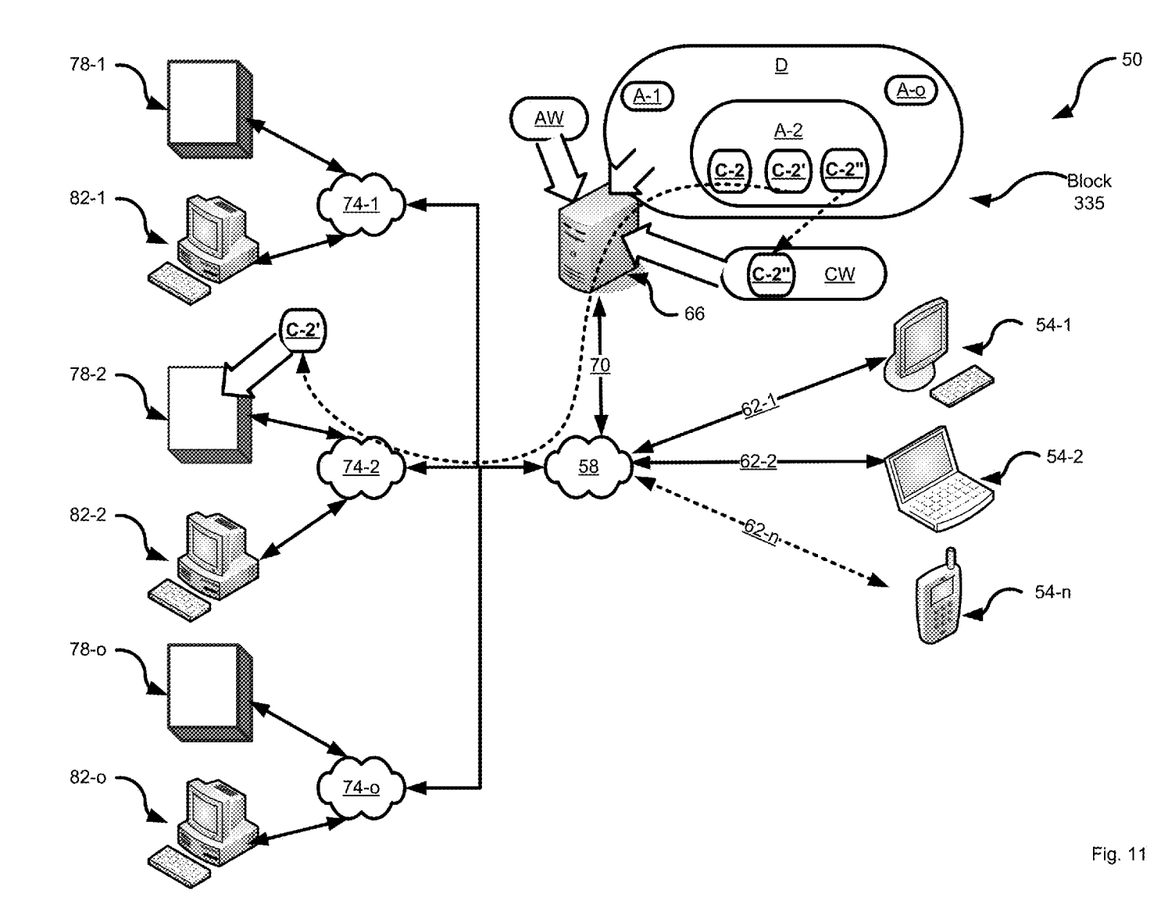
FIG. 11 shows the system of FIG. 1 during performance of one of the blocks from FIG. 5.

Block 330 comprises adjusting the content for each profile from block 325. Continuing with the example from above, block 330 comprises modifying content C-2 in order to conform that content with the computing environment profiles fixed display computer 78-2 and a standard desktop computing environment. Block 330 is represented in FIG. 10, where content C-2 is shown as stored in association with account A-2, but in addition modified content C-2' is shown as stored in association with account A-2, and modified content C-2" is shown as stored in association with account A-2. Modified content C-2' is optimized for generation on fixed display computer 78-2, while modified content C-2" is optimized for generation on a standard desktop computing environment. Continuing with the specific example, the optimization addresses the exclusion of standard input device on fixed display computer 78-2 and the presence of an input device on client computing devices 54. Thus, modified content C-2' is configured so that page one and page two of content C-2 automatically cycle between each other after a predefined time period, and/or are scaled so they appear simultaneously on display 124, and/or configured to automatically scroll between all three views. Thus modified content C-2' excludes the ability to navigate modified content C-2' via input device.

By the same token, modified content C-2" is configured to be interactive, such that toggling between viewing of page one and page two is interactive, responsive to input received via an input device on a given computing device 54. Thus modified content C-2" includes the ability to navigate modified content C-2" via input device.

Block 335 thus comprises electronically publishing content generated at block 330. In the specific example, block 335 is represented in FIG. 10, where content C-2' is shown as being uploaded onto fixed display computer 78-2 for storage in non-volatile storage 212 of fixed display computer 78-2. At point, a graphic application executing on processor 208 can access content C-2' and generate content C-2' on display 224. In addition, content C-2" is stored in association with a content web site CW. Content C-2", as stored in content web site CW, is now available for access by client computing devices 54 as web content, browsable by client computing devices 54 in the usual manner.

The foregoing discusses certain specific embodiments, but it is to be understood that variations, subsets, and combinations of those embodiments are contemplated. The claims attached hereto define the scope of monopoly. For example, it should now be understood that further adjustments can be made at block 330 to effect different optimizations, to accommodate a variety of differences between fixed display computer 78-2 and client computing devices 54, such as screen size, number of pixels of a display, number of colours that can be displayed, refresh rates, and the like that depend on the hardware and software environment. Other modifications are contemplated. For example, content C-2' can be blended with other content, such as banners showing local news, local weather, advertising, special event schedules such as concerts, sporting events, fairs, exhibitions that are meaningful within the location in which fixed display computer 78-2 is situated. By the same token content C-2" can, for example, be "windowed" within another web page. Such windowing can occur, for example, on another web page that includes an index of restaurants, where content C-2" is generated for one restaurant, within the context of a list of other restaurants. In this manner, content C-2" can be updated without having to rewrite the entire restaurant index web page. Other modifications to content C-2' that differ from modifications to content C-2" will now occur to those skilled in the art. It should be understood that content C-2" can also be configured for other types of computing devices 54 and/or content delivery environments, such as a social networking application such as Twitter, Facebook, My Space, or search engines, or web pages or any of combinations of them. Other types of content C-2" will now occur to those skilled in the art. It should also be understood that even further versions of modified content C-2 can be generated, to accommodate, for example, differences between the computing environments of different computing devices 54. For example, a further modified version of content C-2 can be generated that is specific to the limited screen size on client computing device 54-n. It should also be understood that while some of these examples relate to fixed display computers 78 for restaurants, other enterprise environments are contemplated, including automobile dealerships, retail outlets, real-estate developments, condominium sales centers, which incorporate a fixed display computer 78.

As another example of a variation, the functionality of server computer 66 can be distributed across a plurality of other server computers. For example, the content creation and maintenance can be effected via server computer 66, while the web hosting functionality of content web site CW can be placed on one or more other server computers.

The invention claimed is:

1. A method for generation of content for distributed heterogeneous computers comprising:
    receiving, from an administration computer, a content administration request via a network;
    establishing a content administration session with said administration computer via said network in response to said request;
    receiving content from said administration computer via said content administration session;
    receiving a first computing environment profile for a fixed display computer; said first computing environment profile excluding any input devices;
    receiving a second computing environment profile for a client computing device; said second computing environment profile being different from said first computing environment profile; said second computing environment profile including at least one input device;
    generating a first set of modified content for said fixed display computer and uploading said first set of modified content to said fixed display computer; wherein said generating said first set of modified content excludes content navigation by any input device; and generating a second set of modified content for said client computing device and publishing said second set of modified content for access via client computing device; wherein said generating said second set of modified content includes content navigation by said at least one input device, wherein said second set of modified content comprises one or more web pages configured to window within another web site.

2. The method according to claim 1 wherein said second computing environment profile comprises at least one of a standard web-browser application and a social networking application.

3. The method of claim 1 wherein said first set of modified content is configured to automatically scroll through different pages of said content.

4. The method of claim 1 wherein said second set of modified content is configured to scroll through different pages of said content based on input device instructions.

5. The method of claim 1 wherein said first set of modified content is blended with one or more of news, local weather, and advertising.

* * * * *